May 20, 1924.

W. W. WHITTON

SPARE TIRE CARRIER

Filed April 4, 1922

1,494,657

INVENTOR.
William W. Whitton
BY M. C. Frank
ATTORNEY

Patented May 20, 1924.

1,494,657

UNITED STATES PATENT OFFICE.

WILLIAM W. WHITTON, OF OAKLAND, CALIFORNIA.

SPARE-TIRE CARRIER.

Application filed April 4, 1922. Serial No. 549,424.

*To all whom it may concern:*

Be it known that I, WILLIAM W. WHITTON, a citizen of the United States, and a resident of 3023 Summit Street, Oakland, county of Alameda, and State of California, have invented certain new and useful Improvements in Spare-Tire Carriers, of which the following is a specification.

This invention relates to spare tire and package carriers for motor vehicles, and is an improvement on the invention patented to me January 17, 1922, No. 1,403,881.

In my former invention, a case having a hinged wall was provided above the differential, and the spare tire was pushed horizontally into the case or pulled out of it, over an upwardly projecting flexible bottom.

In my present invention, my primary object is to provide a drawer in which the spare tire and any auto accessories or packages may be put, and which drawer may be withdrawn for access to its contents. The drawer may rest in a slightly inclined position under the body of the automobile and above the differential. Another object is, that the drawer when viewed from the rear shall appear to be substantially a continuation of the back of the body. And another object is, that the drawer shall be a part of the chassis construction, thus permitting various types of automobile bodies to be mounted upon the chassis. And a still further object is, to provide a depending wall or flap to the rear of the drawer support for obscuring the view of the differential region, and to form in conjunction with the drawer a graceful surface continuation.

In the accompanying sheet of drawings, I have shown my invention, and as much of an automobile as is necessary to convey an understanding of it.

Figure 1:
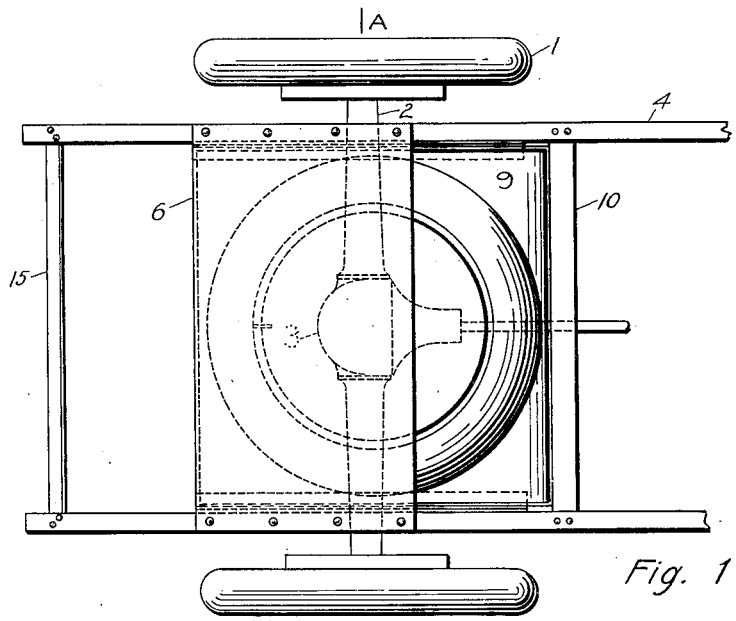
Figure 1 is a plan view showing the rear wheels and frame members, and indicating the drawer, with a tire therein, above the differential housing, the body of the car being removed.

In the figures;—the wheels 1 are mounted on the axle in the housing 2, which latter has midway of its length the differential and its housing 3. The frame members 4 are customarily curved upward over the axle, as indicated, and curved down again to join the supporting springs 5. To the frame members, where they curve upward over the axle, may be secured the cross-plate 6 and the channel pieces 7, the latter having their flanges preferably facing toward each other, thereby adapting the lower flanges 8 to serve as supporting rests for the drawer 9, and the forward stop for the drawer may be the cross-brace 10 of the frame. The drawer may be rectangular or other form in shape, and preferably have its bottom raised centrally and of such height, diameter and form as to receive and hold a spare tire thereon. In any case the drawer provides a receptacle for the tire, inclosing it completely but leaving the center space open to allow the customary clearance-room above the differential for the spring-movements of the automobile. This clearance is clearly shown in Figures 2 and 3. Thus the yielding of the springs of the automobile when passing over bumps on the road, is accommodated by plenty of room above the differential housing and within the central space of the drawer.

Figure 2:
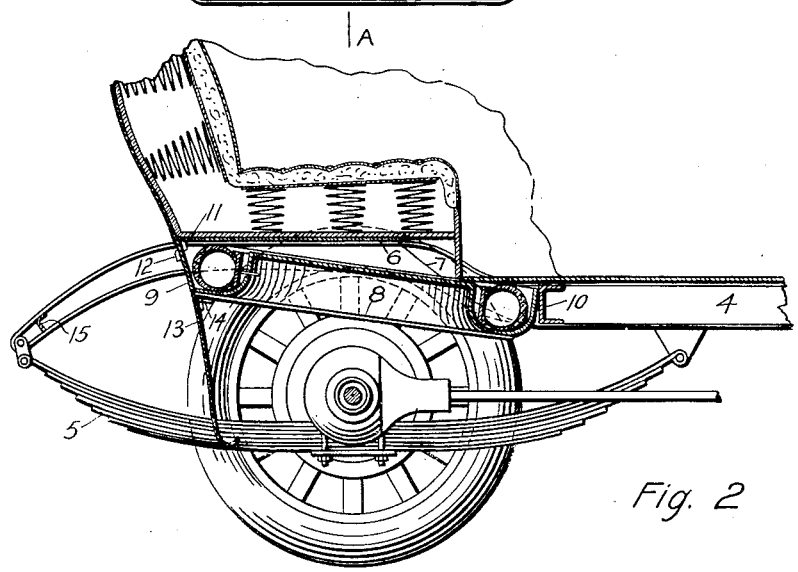
Figure 2 is a longitudinal sectional elevation of the back part of an automobile equipped with my invention.
Figure 3:
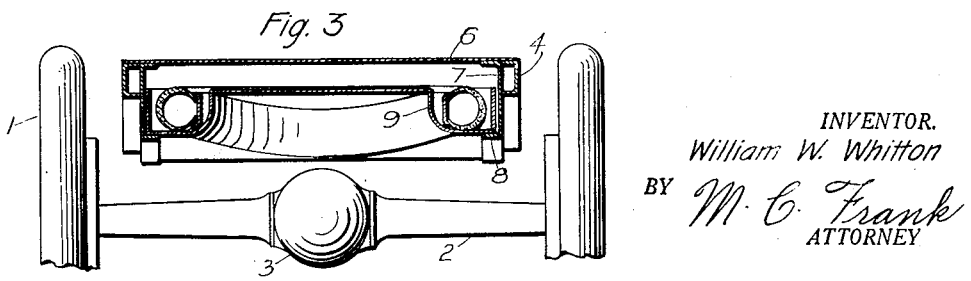
Figure 3 is a rear elevation of Fig. 1, the wheels being broken away, and showing in section, the frame members, the drawer and the tire therein along the line A—A.

The inclined position of the supporting rests for the drawer makes it very easy to slide the drawer into place, and naturally tends to keep it there even if not locked, but a lock 11, Fig. 2, is provided to secure the drawer in place and to prevent theft and tampering. Handles 12 are also provided to open the drawer. A depending flap or wall 13 may be secured at the point 14 on the supporting rests of the drawer to obscure the differential region from view.

In removing the drawer in service, the cross-brace 15 of the chassis may serve as a stop, thus temporarily supporting the drawer.

Other parts shown in the drawings but not specifically referred to, are ordinary structural parts and need no description.

Having thus described the preferred form of my invention, it is to be understood that I do not limit myself to the precise arrangement and construction shown and described, but wish to include all modifications of it that come within the spirit and scope of the invention as claimed.

I claim:—

1. In combination, the rear body portion of an automobile, a chassis thereunder having a space above the rear axle thereof, a drawer occupying said space and adapted to slide therein, said drawer having the central part of its bottom raised and of such height, diameter and form as to receive and hold a tire thereon, and a depending extension under said drawer, the rear wall of said body portion and the rear wall of said drawer and the said extension being substantially in the same plane or curvature for presenting a continuous surface.

2. In a chassis, a cross-plate secured to the longitudinal members thereof, channel members secured to said cross-plate, and a drawer of shallow depth adapted to engage said channel members and slide therebetween the said channel members incasing the said drawer.

3. In a chassis provided with a shallow drawer, a cross-plate secured to the longitudinal members thereof, drawer supports secured to said cross-plate and cross-braces secured to said longitudinal members forward and rearward of said cross-plate, the forward brace adapted to serve as a stop for the drawer, and the rear brace adapted to serve as a temporary support for the drawer when withdrawn.

WILLIAM W. WHITTON.